(12) United States Patent
Narita

(10) Patent No.: US 9,115,216 B2
(45) Date of Patent: Aug. 25, 2015

(54) METHOD FOR PRODUCING ALKALI CELLULOSE COMPRISING REMOVAL OF CELLULOSE PARTICLES

(75) Inventor: Mitsuo Narita, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 586 days.

(21) Appl. No.: 13/398,317

(22) Filed: Feb. 16, 2012

(65) Prior Publication Data

US 2012/0214982 A1    Aug. 23, 2012

(30) Foreign Application Priority Data

Feb. 21, 2011    (JP) ................................. 2011-034472

(51) Int. Cl.
- C08B 1/06    (2006.01)
- C08B 1/08    (2006.01)
- C08B 11/00   (2006.01)
- C08B 11/193  (2006.01)

(52) U.S. Cl.
CPC . *C08B 1/08* (2013.01); *C08B 11/00* (2013.01); *C08B 11/193* (2013.01)

(58) Field of Classification Search
CPC .............. C08B 1/08; C08B 1/06; C08B 11/02
USPC ............................................. 536/124, 61, 85
See application file for complete search history.

(56) References Cited

U.S. PATENT DOCUMENTS

| | | | |
|---|---|---|---|
| 2,054,299 A | 9/1936 | Richter |
| 2,138,014 A | 11/1938 | Richter |
| 2,469,764 A | 5/1949 | Erickson |
| 3,943,233 A | 3/1976 | Swanson et al. |
| 4,117,223 A | 9/1978 | Lodige et al. |
| 4,310,663 A | 1/1982 | Hilbig et al. |
| 4,316,982 A | 2/1982 | Holst et al. |
| 4,363,784 A | 12/1982 | Hilbig et al. |
| 4,410,693 A | 10/1983 | Gibson et al. |
| 4,508,895 A | 4/1985 | Balser |
| 4,612,345 A | 9/1986 | Hess |
| 8,017,766 B2 | 9/2011 | Narita et al. |
| 8,496,782 B2 | 7/2013 | Narita |
| 2007/0144692 A1 | 6/2007 | Narita et al. |
| 2007/0149771 A1 | 6/2007 | Narita et al. |
| 2007/0149772 A1 | 6/2007 | Narita et al. |
| 2007/0149773 A1 | 6/2007 | Narita et al. |
| 2007/0149774 A1 | 6/2007 | Narita et al. |
| 2008/0003429 A1 | 1/2008 | Luo et al. |
| 2009/0071377 A1 | 3/2009 | Wohrmeyer et al. |
| 2009/0165971 A1 | 7/2009 | Narita |
| 2009/0165972 A1 | 7/2009 | Narita |

FOREIGN PATENT DOCUMENTS

| | | |
|---|---|---|
| CN | 1990507 A | 7/2007 |
| CN | 101096431 A | 1/2008 |
| EP | 1 734 055 A2 | 12/2006 |
| EP | 1 803 736 A1 | 7/2007 |
| EP | 1 803 737 A1 | 7/2007 |
| EP | 1 803 738 A1 | 7/2007 |
| EP | 1 803 739 A1 | 7/2007 |
| EP | 1 873 302 A2 | 1/2008 |
| EP | 1 878 752 A1 | 1/2008 |
| JP | 47-003964 B | 2/1972 |
| JP | 47-003965 B | 2/1972 |
| JP | 48-019232 B | 6/1973 |
| JP | 48-026385 B | 8/1973 |
| JP | 53-041356 A | 4/1978 |
| JP | 55-145701 A | 11/1980 |
| JP | 56-002302 A | 1/1981 |
| JP | 3073562 B | 11/1983 |
| JP | 59-056401 A | 3/1984 |
| JP | 60 040101 A | 3/1985 |
| JP | 61-264001 A | 11/1986 |
| JP | 64-085201 A | 3/1989 |
| JP | 10-158302 A | 6/1998 |
| JP | 10-279601 A | 10/1998 |
| JP | 2000-506215 A | 5/2000 |
| JP | 2001-002701 A | 1/2001 |
| JP | 2001-302701 A | 10/2001 |
| JP | 2003-171401 A | 6/2003 |
| JP | 2003-183301 A | 7/2003 |
| JP | 2005-008827 A | 1/2005 |
| JP | 2005-239845 A | 9/2005 |
| JP | 2006-348177 A | 12/2006 |
| JP | 2007-197677 A | 8/2007 |
| JP | 2007-197678 A | 8/2007 |
| JP | 2007-197679 A | 8/2007 |
| JP | 2007-197680 A | 8/2007 |
| JP | 2007-197681 A | 8/2007 |
| JP | 2007-197682 A | 8/2007 |
| JP | 4087534 B2 | 2/2008 |
| JP | 2009-155534 A | 7/2009 |
| JP | 2009-173907 A | 8/2009 |
| JP | 2009-528972 A | 8/2009 |
| WO | WO 97/33918 A1 | 9/1997 |
| WO | WO 2007/023513 A1 | 3/2007 |

OTHER PUBLICATIONS

Extended Search Report for Application No. EP 12 15 6041.1 dated Jun. 29, 2012.

(Continued)

*Primary Examiner* — Patrick Lewis
*Assistant Examiner* — Everett White
(74) *Attorney, Agent, or Firm* — Alston & Bird LLP

(57) ABSTRACT

There is provided a method for producing alkali cellulose comprising efficiently removing cellulose particles which are introduced by a pulp and have accumulated in a circulating alkali metal hydroxide solution. More specifically, there is provided a method for producing alkali cellulose, comprising at least the steps of bringing a pulp into contact with an alkali metal hydroxide solution to obtain a contact product, draining the contact product by a drainer, reusing an alkali metal hydroxide solution recovered in the step of draining for contact with a pulp, and adjusting an amount of cellulose particles in the recovered alkali metal hydroxide solution to 0.5% by weight or less prior to reusing for contact with the pulp.

3 Claims, 2 Drawing Sheets

(56) References Cited

OTHER PUBLICATIONS

Office Action for Chinese Application No. 201210038976.9 dated Dec. 4, 2013.
Extended European Search Report from European Application No. 12156046.0, dated Jun. 8, 2012.
Michie, R.I.C., et al.; Kinetic Study of the Autoxidation of Cellulose Suspended in Sodium Hydroxide Solution; Journal of Polymer Science; Part A; vol. 2, pp. 2063-2083.
Partial Translation of "Cellulose No Jiten (Encyclopedia of Cellulose)", edited by the Cellulose Society of Japan and published on Nov. 10, 2000, 3 pages.
European Search Report for Application No. 12156044.5 dated Jun. 26, 2012.
European Search Report for Application No. 12156043.7 dated Jun. 22, 2012.
European Search Report for Application No. 12156045.2 dated Jun. 18, 2012.
Office Action for Japanese Application No. 2011-034469 dated May 8, 2013.
Office Action for Japanese Application No. 2011-034471 dated May 8, 2013.
Office Action from Japanese Application No. 2011-034472, dated Jul. 8, 2014.
Office Action from Japanese Application No. 2011-034468, dated Jul. 8, 2014.
Office Action from U.S. Appl. No. 13/398,247 dated Sep. 4, 2014.
Office Action from U.S. Appl. No. 13/398,273 dated Aug. 28, 2014.
Office Action from U.S. Appl. No. 13/398,369 dated Aug. 28, 2014.
Office Action from U.S. Appl. No. 13/398,393 dated Sep. 11, 2014.
Office Action for Japanese Application No. 2012-034021 dated Oct. 21, 2014.
Office Action for U.S. Appl. No. 13/398,247 dated Mar. 24, 2015.
Office Action for U.S. Appl. No. 13/398,273 dated Apr. 10, 2015.
Office Action for U.S. Appl. No. 13/398,369 dated Apr. 23, 2015.
Office Action for U.S. Appl. No. 13/398,393 dated Apr. 23, 2015.

METHOD FOR PRODUCING ALKALI CELLULOSE COMPRISING REMOVAL OF CELLULOSE PARTICLES

BACKGROUND OF THE INVENTION

1. Field of the Invention

The present invention relates to a method for producing alkali cellulose and a method for producing cellulose ether by using the alkali cellulose.

2. Description of the Related Art

A method for producing cellulose ether has been known in which a highly purified pulp is brought into contact with an alkaline solution to form alkali cellulose, and the alkali cellulose is subjected to etherification reaction by using an etherifying agent. The cellulose ether obtained at the end becomes soluble in water by adequately controlling the degree of substitution. However, a water-insoluble portion is still present therein to reduce the transmittance of the aqueous solution thereof or to reduce the commercial value as contamination.

The insoluble portion is caused by a low-substituted portion having insufficient amount of substituents to be dissolved in water. One of the causes is that an alkali distribution in the alkali cellulose is not uniform.

Activities of this alkali includes facilitating penetration of the etherifying agent by swelling cellulose to change the crystal structure in the pulp, catalyzing the etherification reaction with alkylene oxide, and becoming a reactant for alkyl halide. Accordingly, a portion of the pulp which has not been brought into contact with an aqueous alkali solution does not participate in the reaction and becomes an undissolved portion. Unevenness of alkali cellulose leads directly to the amount of undissolved portion.

A method for efficiently producing uniform alkali cellulose has been proposed in JP 2007-197682A. The method for producing alkali cellulose comprises the steps of continuously bringing a pulp into contact with an alkali metal hydroxide solution in a various type of contactor to obtain a contact product, and draining the contact product.

In the method, the alkali metal hydroxide solution recovered in the step of draining is usually reused or circulated for contact with a pulp.

SUMMARY OF THE INVENTION

A typical problem during circulating the alkali metal hydroxide solution recovered in the step of draining for contact with a pulp is that cellulose particles sometimes accumulates in the circulating alkali metal hydroxide solution, the cellulose particles having been contained by the pulp. In addition, the increased amount of cellulose particles in the circulating alkali metal hydroxide solution results in poor filtration in the step of draining. The poor filtration does not allow alkali cellulose having a desired composition to be formed. Consequently, cellulose ether having a desired degree of substitution and transmittance cannot be obtained. A possible method for removing cellulose particles from the circulating alkali metal hydroxide solutions is considered to comprise use of a continuous centrifugal separator having a pore-free rotator. However, this method is not industrially satisfactory because the continuous centrifugal separator is expensive and a problem such as blockage by the cellulose particles inside the separator may take place.

According to the invention, provided is a method for producing alkali cellulose, comprising at least the steps of bringing a pulp into contact with an alkali metal hydroxide solution to obtain a contact product, draining the contact product by a drainer, reusing an alkali metal hydroxide solution recovered in the step of draining for contact with a pulp, and adjusting an amount of cellulose particles in the recovered alkali metal hydroxide solution to 0.5% by weight or less prior to reusing for contact with the pulp.

A preferred embodiment of adjusting an amount of cellulose particles in the alkali metal hydroxide solution comprises removing a foam layer containing a high concentration of cellulose particles from the recovered alkali metal hydroxide solution. Removal of the cellulose particles from the recovered alkali metal hydroxide solution leads to adjustment of the amount of cellulose particles in the alkali metal hydroxide solution.

According to the invention, also provided is a method for producing cellulose ether, comprising at least a step of reacting the produced alkali cellulose with an etherifying agent.

According to the invention, the cellulose particles can be removed efficiently from the alkali metal hydroxide solution containing the cellulose particles. As a result, it is possible to prevent the decline of draining efficiency in the production of alkali cellulose and to produce alkali cellulose efficiently. In addition, increase in the weight ratio of alkali metal hydroxide in alkali cellulose to a solid component in the pulp owing to the decline of draining efficiency can be suppressed so that the decline in the transmittance of the cellulose ether obtained as a final product can be suppressed.

DETAILED DESCRIPTION OF THE PREFERRED EMBODIMENTS

Figure 1:
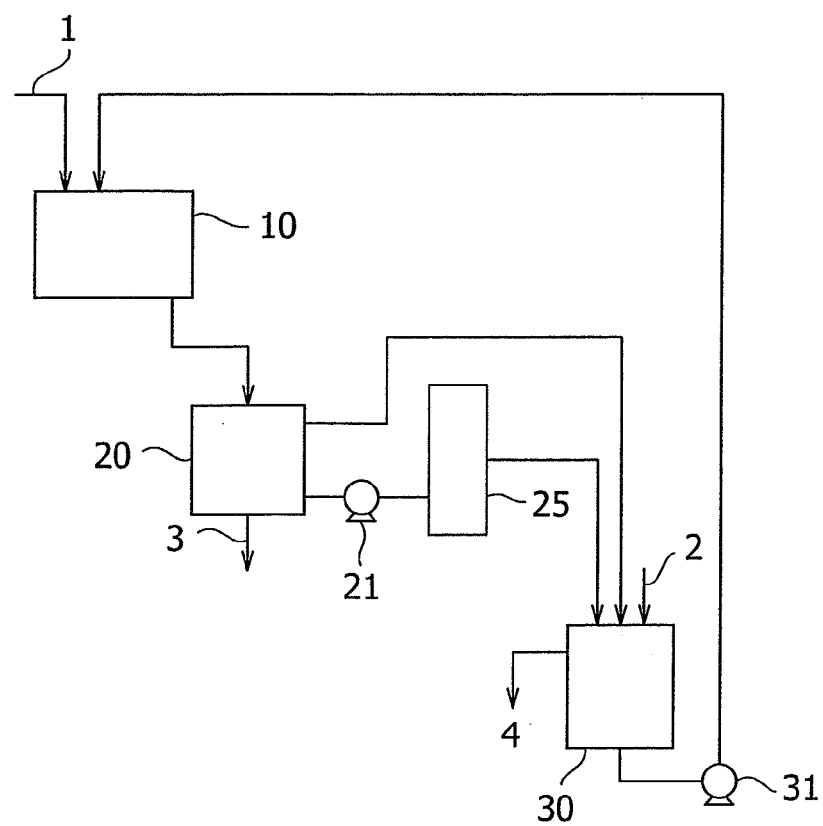
FIG. 1 shows an example of an apparatus for producing alkali cellulose.

Examples of the pulp may include wood pulp and cotton linter pulp. The wood may include needle-leaf trees such as pine, spruce and hemlock, and broad-leaf trees such as eucalyptus and maple.

A pulp is preferably in sheet, powder or chip form.

A powdery pulp can be obtained by pulverizing a pulp sheet and is in powder form. A pulp powder having an average particle size of 10 to 1,000 μm is typically used, but the pulp powder is not limited thereto. The method for producing the pulp powder is not limited. For example, a pulverizer such as a knife mill and a hammer mill can be used.

A method for producing pulp chips is not limited. For example, the pulp chips can be produced obtained by cutting a pulp sheet with a slitter cutter or the other existing cutting apparatus. It is advantageous to use a cutting apparatus capable of continuous processing in consideration of cost.

The plane face area of the chip is preferably from 4 to 10,000 mm$^2$, more preferably from 10 to 2,500 mm$^2$. When the plane face area is less than 4 mm$^2$, the production of pulp chips may be difficult When the plane face area is greater than 10,000 mm$^2$, handling such as feed into the contactor, movement inside the contactor, and introduction into a continuous centrifugal separator may become difficult The "plane face area of pulp chip" as used herein means the largest face area of six face areas of the hexahedra chip, supposing that each pup chip has a hexahedral shape Among these pulps, a pulp in the chip form is most preferred from the viewpoints of easy molding and resistance to clogging of pores of the centrifugal separator.

There is no particular limitation on the alkali metal hydroxide solution insofar as alkali cellulose can be obtained. It is preferably an aqueous solution of sodium hydroxide or potassium hydroxide. The aqueous sodium hydroxide solution is particularly preferable in economic terms. Although water is usually used as a solvent for dissolving alkali hydroxide, a lower alcohol (preferably an alcohol having 1 to 4 carbon atoms) or the other inert solvent may be used. A single solvent or a combination of two or more solvents may be used.

The concentration of alkali metal hydroxide solution is preferably 23 to 60% by weight, particularly preferably 35 to 55% by weight. When the concentration is less than 23% by weight, it is economically disadvantageous because the etherifying reactant undergoes a side reaction with water in the next step for producing cellulose ether. In addition, cellulose ether having a desired degree of substitution may not be obtained so that the transparency of an aqueous cellulose ether solution may be lowered. When the concentration is more than 60% by weight, handling may be difficult because of the increased viscosity. It should be noted that the concentration of the alkali metal hydroxide solution to be used for contact with the pulp is preferably kept constant in order to stabilize the composition of alkali cellulose and to ensure the transparency of cellulose ether.

A contactor for bringing the pulp into contact with an alkali metal hydroxide solution may be of a batch type or a continuous type. Preferred is the contactor which can adjust a period of time from the start of bringing the pulp into contact with an alkali metal hydroxide solution by the complete immersion of the pulp in the alkali metal hydroxide solution to the end of subsequent draining by a drainer such as a centrifuge separator in a later step, and also can keep the variation of the time small. The contactor of a continuous type is preferable from the viewpoint of productivity. A continuous type of contactor preferably has a small variation of time such as something close to piston flow. Examples of the contactor may include a pipe type contactor, a bucket-conveyor type contactor, a screw-conveyor type contactor, a belt-conveyor type contactor and a rotary-feeder type contactor.

If necessary, the contact mixture may be subjected to stirring or shear force for formation of a porridge-like mixture.

A ratio of the weight of a pulp to the volume of an alkali metal hydroxide solution to be used per unit time is preferably 0.15 kg/L or less, more preferably 0.10 kg/L or less, still more preferably 0.05 kg/L or less. When the ratio is more than 0 15 kg/L, the alkali distribution in the alkali cellulose may not be uniform because of difficulty in complete immersion of the pulp in the solution. As a result, the quality of the product may be lowered. It should be noted that the lower limit for the ratio of the pulp weight to the volume of alkaline solution is preferably 0.0001 kg/L. When the ratio is lower than 0.0001 kg/L, the facility may become impractically large.

It is preferable that the contactor for bringing a pulp into contact with an alkali metal hydroxide solution can optionally control the temperature of the alkali metal hydroxide solution and/or the contact time in consideration of obtaining alkali cellulose having a desired composition. It is because the composition of the alkali cellulose is dependent on the amount of alkali metal hydroxide solution absorbed by the pulp, and the absorbed amount can be adjusted by controlling the contact time and the temperature of the alkali metal hydroxide solution.

A known technique can be used as a method for adjusting the temperature of the alkali metal hydroxide solution. It is preferable to use a heat exchanger which may be located inside or outside the contactor. The temperature of the alkali metal hydroxide solution is not particularly limited. It is preferably adjusted in the range of 20 to 80° C. It is preferable that the contactor is suited for continuous processing. The contactor of a continuous type is advantageous in terms of space because the body of the contactor can be downsized as compared to the contactor of a batch type.

A method for adjusting the contact time may preferably include changing of the length of the contact zone, changing of the rotation frequency of a screw-conveyor type device or a rotary-feeder type contactor, and changing of the fluid flow rate of a pipe type contactor. The contact time is preferably in the range of 1 second to 15 minutes, more preferably 2 seconds to 2 minutes. When the contact time is less than 1 second, it may be extremely difficult to control the amount of absorption. When the contact time is more than 15 minutes, the device may become excessively large or the productivity may decline. In addition, the amount of alkali absorption by the pulp may become excessive so that it may be difficult to obtain alkali cellulose having a desired composition suitable for the production of cellulose ether, no matter what type of the drainer will be used.

Passing the fed pulp without being brought into contact with alkali at all has to be avoided in terms of the quality. It is preferable to pass the pulp through the contactor so as to be able to contact the alkali metal hydroxide solution completely while taking particular caution that the pulp tends to float in the alkali metal hydroxide solution.

It is preferable to feed the pulp and the alkali metal hydroxide solution into the contactor in this order or to mix the pulp and the alkali metal hydroxide solution before being introduced into the contactor. When the pulp and the alkali metal hydroxide solution are mixed beforehand, it is preferable to control this contact time since the pulp and the alkali metal hydroxide solution have already been brought into contact.

In addition, it is more preferable that the contactor for bringing the pulp into contact with an alkali metal hydroxide solution can be evacuated or replaced by nitrogen in order to prevent the degree of polymerization of the alkali cellulose from being reduced in the presence of oxygen. When the degree of polymerization in the presence of oxygen is intended to be controlled at the same time, it is preferable that the contactor has a mechanism capable of controlling the amount of oxygen.

The drainer may include a centrifugal separator and a filtration-based solid-liquid separator. The centrifugal separator is preferred.

A centrifugal separator is a separator which can separate a liquid portion from a solid portion by using centrifugal force. The centrifugal separator may be of a batch type or a continuous-type. The centrifugal separator of a continuous type is preferred from the viewpoint of productivity. The continuous centrifugal separator includes a centrifugal separator having a rotator without pores such as a decanter and a centrifugal separator having a rotator with pores like a rotating basket. The centrifugal separator having a rotator with no pores is specialized in a centrifugal sedimentation operation. The centrifugal separator having a rotator with pores can utilize centrifugal filtration and centrifugal dehydration operations in addition to the sedimentation operation. The continuous centrifugal separator having a rotator with pores is preferred in view of easy removal of liquids. This is because the true density of cellulose and the density of the aqueous sodium hydroxide solution are relatively close and thus it is more advantageous to utilize, in terms of processing capacity, centrifugal filtration and centrifugal dehydration operations in addition to the centrifugal sedimentation operation rather than to rely solely on the centrifugal sedimentation operation. The continuous centrifugal separator having a rotor with pores may include an automatic discharge type centrifugal dehydrator, a screw-discharge type centrifugal dehydrator, a vibration-discharge type centrifugal dehydrator and an extrusion-sheet type centrifugal dehydrator. It should be noted that dehydration conducted by a dehydrator is not limited to removal of "water" but includes removal of the whole type of liquid.

Of these centrifugal dehydrators, the screw-discharge type centrifugal dehydrator and the extrusion-sheet type centrifugal dehydrator are particularly preferred industrially because they can be operated with less trouble. The shape of the rotor with pores (for example, a rotating basket) may include any of a conical type, a cylindrical type, a vertical type or a horizontal type. The shape of the pores in the screen in the rotor with pores is not particularly limited. The pores may include a wire mesh, round pores, triangular pores, pores with raised hoods such as those of Conidur®, and slit pores. The pore opening in the screen is not particularly limited. The pore opening is preferably 0.1 to 10 mm.

The continuous centrifugal separator can adjust the rotational frequency, i.e., the centrifugal effect, depending on the contact time between a pulp and an alkali metal hydroxide solution, the contact temperature and the required degree of liquid removal. By adjusting the centrifugal effects, the concentration of the alkali metal hydroxide solution provided repeatedly for contact with the pulp can be kept constant so that cellulose ether exhibiting high transparency can be obtained. When the contact time and/or the contact temperature is intended to be increased from the current operating conditions, the level of centrifugal effect can be reduced. When the contact time and/or the contact temperature is intended to be decreased, the level of centrifugal effect can be increased. It is preferable to suppress the variation in the concentration of alkali metal hydroxide solution within ±10%, particularly preferably within ±5%.

The centrifugal effect is preferably at least 100, more preferably at least 200. When the centrifugal effect is smaller than 100, liquid removal may be insufficient There is no particular upper limit for the centrifugal effect. For example, the upper limit may be 5,000 for a commercially available typical centrifugal separator. When the centrifugal effect is preferably at least 100, more preferably at least 200, the concentration of the alkali metal hydroxide solution can be kept low when reusing the recovered alkali metal hydroxide solution to be described later.

If necessary, an alkali solution can be added dropwise or sprayed to the cake in the midst of liquid removal.

It should be noted that the centrifugal effect is a value which indicates the magnitude of the centrifugal force, and is given by the ratio of centrifugal force to gravity as described in "Encyclopedia of Chemical Engineering, New Edition, edited by The Society of Chemical Engineers, Japan", published May 30, 1974. The centrifugal effect Z is represented by the following equation:

$$Z=(\omega^2 r)/g=V^2/(gr)=\pi^2 N^2 r/(900 g)$$

In the above formula, r denotes the rotational radius of the rotor (unit: m), ω denotes the angular velocity of the rotor (unit: rad/sec), V denotes the peripheral velocity of the rotor (unit: m/sec), N denotes the rotational frequency of the rotor (rpm), and g denotes the gravitational acceleration (m/sec²).

The alkali metal hydroxide solution recovered by draining can be reused. When the alkali metal hydroxide solution is reused, it is preferable to continuously feed, into the system, the same amount of the alkali metal hydroxide solution as the amount of the alkali metal hydroxide solution which has been taken out of the system as alkali cellulose. In this case, it is possible to temporarily place the alkali metal hydroxide solution recovered by draining in a buffer tank and then feed it to the contactor from the buffer tank, while adding fresh alkali metal hydroxide solution so as to maintain a constant level of the tank.

According to the invention, the operation is carried out continuously while reusing the alkali metal hydroxide solution recovered by draining. Here, the term "continuous" refers to cases where cellulose particles within an alkali hydroxide solution exceeds 0.5% by weight without removal of the foam because of at least accumulation of the cellulose particles within the alkali hydroxide solution. For example, it refers to a continuous operation of more than 50 hours, preferably more than 100 hours.

FIG. 1 shows an example of an apparatus for producing alkali cellulose. The apparatus comprises a contactor 10 for bringing a pulp 1 into contact with an alkali metal hydroxide solution 2 to obtain a contact product, a centrifugal separator 20 for separating the obtained contact product into alkali cellulose 3 and a liquid containing alkali metal hydroxide, a concentrator 25 for concentrating a portion or all of the separated liquid containing alkali metal hydroxide, such as an evaporator, and a tank 30 for mixing the liquid containing alkali metal hydroxide which has been separated by the centrifugal separator 20 and/or concentrated by the concentrator 25 with an alkali metal hydroxide solution. After removing foam 4, the mixed solution obtained in the tank 30 is transferred to the contactor 10 and can be reused for contact with the pulp. In FIG. 1, the liquid containing alkali metal hydroxide which has been separated by the centrifugal separator is transferred to the concentrator 25 by using a pump 21, and the liquid containing alkali metal hydroxide in the tank 30 is transferred to the contactor 10 by using a pump 31. The foam 4 may be removed in the concentrator 25, instead of the tank 30, or as well as the tank 30.

Figure 2:
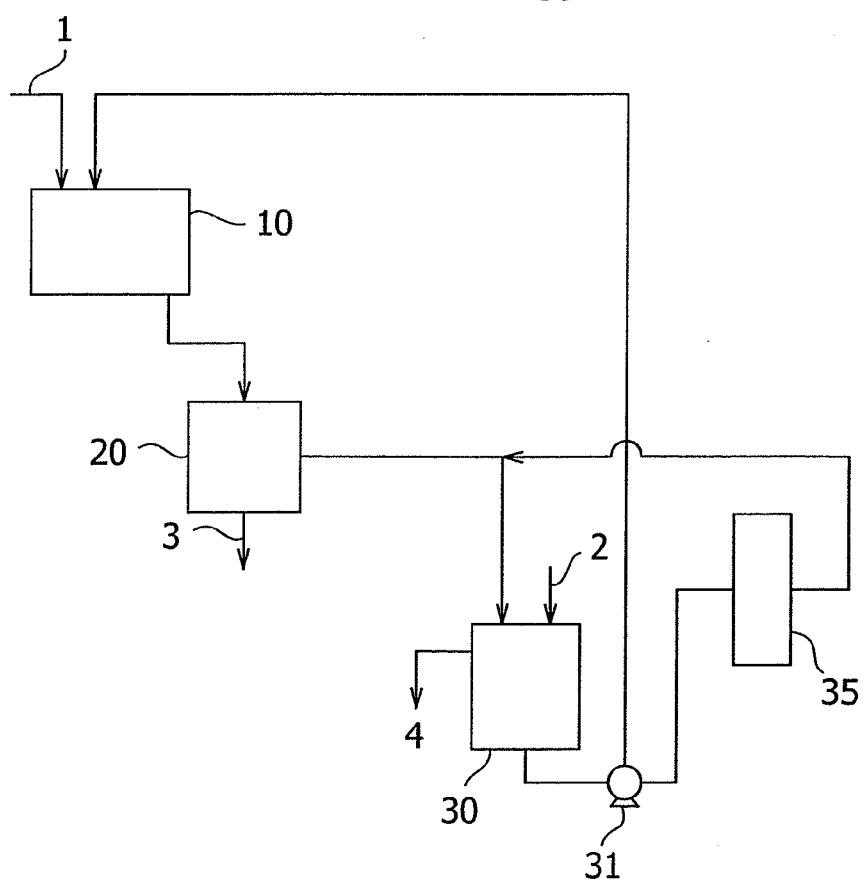
FIG. 2 shows another example of an apparatus for producing alkali cellulose.

In FIG. 1, the concentrator 25 is arranged upstream of the tank 30. However, as shown in FIG. 2, there is also an embodiment in which a concentrator 35 is arranged downstream of the tank 30, and a portion or all of the mixture of the liquid containing alkali metal hydroxide which has been separated by the centrifugal separator 20 and an alkali metal hydroxide solution is concentrated and then returned to the tank 30. In this embodiment, when the concentration of alkali metal hydroxide in the tank 30 becomes lower than the predetermined concentration, the concentration in the tank 30 can be returned to the predetermined concentration without an addition of an alkali metal hydroxide solution. After removing the foam 4, the mixed solution obtained in the tank 30 is transferred to the contactor 10 and can be reused for contact with the pulp. The foam 4 may be removed in the concentrator 35, instead of the tank 30, or as well as the tank 30.

A weight ratio of the alkali metal hydroxide contained by the cake obtained by drainer to a solid component in the pulp (alkali metal hydroxide/solid component in the pulp) is preferably in the range of 0.3 to 1.5, more preferably 0.65 to 1.30, still more preferably 0.90 to 1.30. When the weight ratio is 0.3 to 1.5, the transparency of the solution of the obtained cellulose ether is increased. Here, the solid component in the pulp comprises, in addition to cellulose serving as the main component, organic matter such as hemicellulose, lignin and resin components, and inorganic matter such as Si components and Fe components.

The weight ratio of the alkali metal hydroxide to a solid component in the pulp can be determined by the titration method shown below when the alkali metal hydroxide is, for example, sodium hydroxide.

First, 4.00 g of a cake is collected and the amount (% by weight: wt %) of the alkali metal hydroxide contained in the cake is determined by neutralization titration (0.5 mol/L $H_2SO_4$, indicator: phenolphthalein). A blank test is also performed in the same manner.

wt % of alkali metal hydroxide=(normality factor)×
{(dropped amount (ml) of $H_2SO_4$)−(dropped
amount (ml) of $H_2SO_4$ in blank test)}

Using the wt % of the alkali metal hydroxide contained in the cake, (alkali metal hydroxide)/(solid component in pulp) is then determined in accordance with the following equation:

(wt of alkali metal hydroxide)/(wt of solid component
in pulp)=(wt % of alkali metal hydroxide)/
[{100−(wt % of alkali metal hydroxide)/
(B/100)}×(S/100)]

In the above equation, B represents the concentration (wt %) of the alkali metal hydroxide solution and S represents the concentration (wt %) of the solid component in the pulp. The concentration of the solid component in the pulp is obtained by dividing the dry weight after drying about 2 g of the pulp at 105° C. for 2 hours by the weight of the pulp and then expressing the quotient by wt %.

With respect to the alkali cellulose, in addition to the pulp feed rate to the contactor, the recovery rate of alkali cellulose after draining or the consumption rate of alkali metal hydroxide solution can be measured; the current composition of alkali cellulose can be calculated on basis of the weights of the alkali metal hydroxide and the pulp; and the contact time, the temperature of the alkali metal hydroxide solution in the contactor, and the pressure for draining can be controlled so as to let the calculated composition reach the target composition. It is also possible to automate these operations of measurements. calculation and control.

The composition of the alkali cellulose can be determined based on the degree of etherification of the cellulose ether obtained by using this alkali cellulose, i.e., the substitution mole number.

According to the invention, the alkali metal hydroxide solution containing cellulose particles refers to, but is not limited to, a solution separated by an appropriate drainer when a pulp is brought into contact with an alkali metal hydroxide solution, and then the resultant is separated into alkali cellulose and the solution by the drainer. It also includes a solution obtained by addition of a fresh alkali metal hydroxide solution to the solution separated by the drainer. It further includes a solution obtained by concentrating the solution separated by the drainer, or by concentrating the solution obtained by addition of a fresh alkali metal hydroxide solution to the solution separated by the drainer.

The cellulose particles are fine powder of cellulose derived from a pulp, and usually in the form of fibers having length of 50 to 5,000 μm and thickness of 10 to 50 μm, and/or aggregates of the fibers. The cellulose particles have sizes which can pass through, for example, a screen of a centrifugal separator. It is considered that the cellulose particles are generated when a sheet pulp is cut into chips or made into powder form, or generated when a portion of the pulp sheet or the pulp chip is crumbed. When the density of the foam layer is measured using a graduated cylinder, and when the solids contained by the foam layer are collected by a filter paper and analyzed using techniques such as microscopy, the presence of cellulose particles and gas (air when the foam is being generated naturally) was confirmed. It is considered that the cellulose particles gathered at the surface together with air or the like which had been contained by an alkali metal hydroxide solution, because the density of the cellulose particles which does not dissolve in the alkali metal hydroxide solution is lower than the density of the alkali metal hydroxide solution and tends to float.

According to the invention, the foam layer may be generated naturally during the production of alkali cellulose, or may be generated intentionally.

The alkali metal hydroxide solution containing cellulose particles is stored in the tank 30 in the example shown in FIG. 1. It is also possible to continuously feed the alkali metal hydroxide solution containing cellulose particles and/or a fresh alkali metal hydroxide solution to the tank 30, and/or to continuously discharge.

Figure 3:
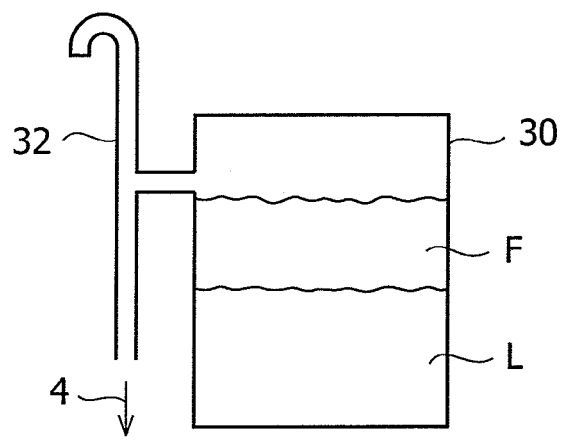
FIG. 3 shows an example of a method for removing a foam layer.
Figure 4:
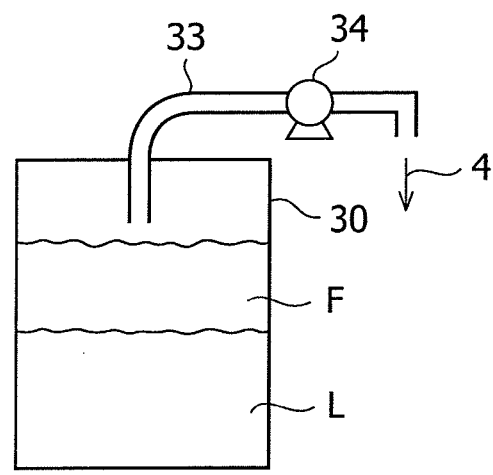
FIG. 4 shows another example of a method for removing a foam layer.

When the foam is generated naturally during the production of alkali cellulose, the foam layer is formed in the upper part of the liquid phase in the tank. A method for removing the foam layer from an inside of the tank may include removal by overflow, removal by suction, removal by scraping using a blade-like device, and removal by skimming using a ladle-like device. In removal by overflow, for example, as shown in FIG. 3, a conduit 32 is connected to a foam layer F in the upper part of a liquid phase L in the tank 30, and the foam 4 is removed through the conduit 32. In removal by suction, for example, as shown in FIG. 4, a conduit 33 is connected to the foam layer F in the upper part of the liquid phase L in the tank 30, and the foam 4 is removed by suction with a suction pump 34. Among these removal methods, the removal by overflow is preferred because it is the simplest method.

When the foam is not generated naturally, it is possible to promote foaming in an appropriate manner. The foam layer in the alkali metal hydroxide solution can be obtained, for example, by injecting gas in the alkali metal hydroxide solution or stirring the alkali metal hydroxide solution.

For example, bubbling is conducted by injecting gas into the liquid phase. With respect to the injection method, for example, a method of using an insertion tube, or a method of feeding gas from the bottom of the tank or the wall being in contact with the liquid phase can be employed. The gas injection may be carried out from several positions. The gas to be injected may be preferably air, inert gas or a mixed gas thereof. The amount of gas injected into 1 $m^3$ of the liquid phase is preferably 0.0001 to 100 $m^3$/min, more preferably 0.001 to 1 $m^3$/min. The gas temperature is not limited, but is preferably 0° C. to 100° C.

Figure 5:
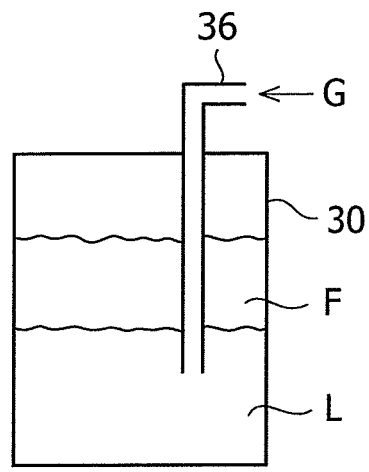
FIG. 5 shows an example of a foam generator by bubbling.

FIG. 5 shows an example of a foaming generator by bubbling, in which a conduit 36 is connected into the liquid phase L below the foam layer F in the tank 30, and bubbling is carried out by injecting gas G into the liquid phase L.

In addition, it is also possible to stir the liquid phase. A suitable stirrer may be used, or the liquid is circulated so that the returning liquid can be dropped from the top of the tank to the liquid surface. The rotational speed of the stirrer is preferably 10 to 20,000 rpm. The amount of the returning liquid is preferably 1 to 50 $m^3$/hr per 1 $m^3$ of the liquid phase.

It is desirable that the concentration of cellulose particles in the liquid phase after removal of cellulose particles is as low as possible. It is preferably 0.01 to 0.5% by weight, more preferably 0.01 to 0.2% by weight, particularly preferably 0.01 to 0.1% by weight.

The method of measuring the concentration of cellulose particles in the liquid phase may be as follows. The 30 g of liquid is collected from the liquid phase, diluted with 500 g of pure water, and then filtered by suction using a filter paper (ADVANTEC No. 2 having a diameter of 80 mm) The material collected by filtration was washed by using 500 g of pure water with suction three times. After the washed material is dried together with the filter paper for 2 hours at 105° C., the total weight of the material and filter paper is measured. The ratio of the weight obtained by subtraction of the absolute dry weight of the filter paper which has been measured in advance from the total weight, to 30 g of the liquid collected, was calculated as the concentration of cellulose particles (% by weight).

The recovered foam layer can be discarded, or alkali cellulose can be recovered therefrom using a suitable concentrator. A method for recovering alkali celluloses from the recovered foam layer may include a method by squeezing with compression, a method by filtration and a method of using a decanter. The recovered alkali cellulose can be used as a raw material for cellulose ether or the like.

The liquid phase can be used in the production of alkali cellulose during or after removal of the foam layer. For example, during or after removal of cellulose particles by the above method, the pulp is continuously brought into contact with the alkali metal hydroxide solution to obtain a contact product, and alkali cellulose can be produced by draining the contact product by a drainer.

Cellulose ether can be produced by using the alkali cellulose obtained by the production method described above as a raw material and reacting with an etherifying agent in a known method.

The etherifying agent may include alkyl halide such as methyl chloride and ethyl chloride, alkylene oxide such as ethylene oxide and propylene oxide, and monochloroacetic acid.

The reaction method may include a batch process and a continuous process. The batch process can be used without any problems. According to the invention, when the method for producing alkali cellulose is carried out in a continuous manner, a continuous reaction process is preferred.

In the batch system, the alkali cellulose discharged from the drainer may be stored in a buffer tank, or placed directly in an etherification reactor. It is preferable from the standpoint of higher productivity to store the alkali cellulose in the buffer tank and then place it in a reaction vessel within a short time, thereby reducing the occupancy time in the etherification reactor. For suppressing decrease in the degree of polymerization, the buffer tank preferably has an oxygen-free atmosphere by vacuum or nitrogen replacement.

Examples of cellulose ether obtainable from the resulting alkali cellulose as a starting material include alkyl cellulose, hydroxyalkyl cellulose, hydroxyalkylalkyl cellulose and carboxymethyl cellulose.

Examples of the alkyl cellulose include methyl cellulose having a methoxy group (DS) of from 1.0 to 2.2 and ethyl cellulose having an ethoxy group (DS) of from 2.0 to 2.6. It should be noted that DS represents the degree of substitution and means the average number of hydroxyl groups replaced by a methoxy group per glucose ring unit of cellulose, while MS represents molar substitution and means the average mole of hydroxypropoxy group or hydroxyethoxy group added per glucose ring unit of cellulose.

Examples of the hydroxyalkyl cellulose may include hydroxyethyl cellulose having a hydroxyethoxy group (MS) of from 0.05 to 3.0 and hydroxypropyl cellulose having a hydroxypropoxy group (MS) of from 0.05 to 3.3.

Examples of the hydroxyalkylalkyl cellulose may include hydroxyethylmethyl cellulose having a methoxy group (DS) of from 1.0 to 2.2 and a hydroxyethoxy group (MS) of from 0.1 to 0.6, hydroxypropylmethyl cellulose having a methoxy group (DS) of from 1.0 to 2.2 and a hydroxypropoxy group (MS) of from 0.1 to 0.6, and hydroxyethylethyl cellulose having an ethoxy group (DS) of from 1.0 to 2.2 and a hydroxyethoxy group (MS) of from 0.1 to 0.6.

Examples further include carboxymethyl cellulose having a carboxymethoxy group (DS) of from 0.2 to 2.0.

EXAMPLES

The invention will be described below by showing Examples and Comparative Example. However, it should not be construed that the invention is limited to these Examples.

Example 1

A pipe having an inner diameter of 38 mm and a length of 10 m was installed. A snake pump equipped with a hopper (the NVL40PL model manufactured by Heishin Ltd.) was connected to the inlet of the pipe, and an aqueous 44% by weight sodium hydroxide solution of 40° C. was fed to the hopper of the snake pump from a cylindrical tank at a rate of 900 L/hr. At the same time, 4 mm square pulp chips being derived from wood and having solid content of 93% by weight was introduced at a rate of 50 kg/hr. The outlet of the pipe was connected to a screw-discharge type continuous rotation basket, where a contact mixture between the pulp chips and the sodium hydroxide solution discharged from the pipe was continuously drained at a centrifugal effect of 1,150. The weight ratio of the alkali metal hydroxide in the obtained alkali cellulose to a solid component in the pulp was determined by the titration method and found to be 1.25.

The liquid portion obtained by draining was returned through a tube inserted into the liquid phase inside an cylindrical tank, while an aqueous 49% by weight sodium hydroxide solution was continuously added to the tank so as to maintain the liquid level inside the tank at a constant level (50 L). Because a foam layer was generated naturally inside the tank, an overflow outlet was provided at a position of the tank level of 100 L, and the foam layer was allowed to overflow. The concentration of cellulose particles in the liquid phase of the tank after 100 hours of operation was 0.5% by weight.

The alkali cellulose, corresponding to 5.5 kg of cellulose and being obtained after 100 hours of operation, was placed in a pressure-resistant reactor. After vacuuming, 11 kg of methyl chloride and 2.7 kg of propylene oxide were added thereto and reacted. The product was washed, dried and pulverized to produce hydroxypropylmethyl cellulose.

A degree of substitution of the obtained cellulose ethers as well as the viscosity and transmittance of an aqueous 2% by weight solution thereof at 20° C. are shown in Table 1. The transmittance of the aqueous 2% by weight solution at 20° C. was measured with a photoelectric colorimeter PC-50 using a cell length of 20 mm and a wavelength of 720 nm.

Example 2

Alkali cellulose was prepared in the same manner as in Example 1 except that bubbling was carried out using nitrogen gas at a rate of 0.15 L/min in the liquid phase of the tank. The concentration of cellulose particles in the liquid phase of the tank after 100 hours of operation was 0.10% by weight. The weight ratio of the alkali metal hydroxide in the obtained alkali cellulose to a solid component in the pulp was 1.25.

Using the alkali cellulose obtained after 100 hours of operation as a starting material, hydroxypropylmethyl cellulose was produced in the same manner as in Example 1. The results are shown in Table 1.

Example 3

Alkali cellulose was prepared in the same manner as in Example 1 except that the liquid at the bottom of the tank was extracted at a rate of 500 L/hr, and the liquid portion obtained by draining was dropped into the tank from the top of the tank. The concentration of cellulose particles in the liquid phase of the tank after 100 hours of operation was 0.10% by weight. The weight ratio of the alkali metal hydroxide in the obtained alkali cellulose to a solid component in the pulp was 1.25.

Using the alkali cellulose obtained after 100 hours of operation as a starting material, hydroxypropylmethyl cellulose was produced in the same manner as in Example 1. The results are shown in Table 1.

Example 4

Alkali cellulose was prepared in the same manner as in Example 1 except that bubbling was carried out using nitrogen gas at a rate of 0.15 L/min in the liquid phase of the tank, the liquid at the bottom of the tank was extracted at a rate of 500 L/hr, and the liquids obtained by draining was dropped into the tank from the top of the tank The concentration of cellulose particles in the liquid phase of the tank after 100 hours of operation was 0.01% by weight. The weight ratio of the alkali metal hydroxide in the obtained alkali cellulose to a solid component in the pulp was 1.25.

Using the alkali cellulose obtained after 100 hours of operation as a starting material, hydroxypropylmethyl cellulose was produced in the same manner as in Example 1. The results are shown in Table 1.

Comparative Example 1

Alkali cellulose was prepared in the same manner as in Example 1 except that an overflow outlet was not provided. The concentration of cellulose particles in the liquid phase of the tank after 100 hours of operation was 0.60% by weight. Because the concentration of cellulose particles exceeded 0.5% by weight, the efficiency of draining declined so that the weight ratio of the alkali metal hydroxide in the obtained alkali cellulose to a solid component in the pulp was increased to 1.60.

Using the alkali cellulose obtained after 100 hours of operation as a starting material, hydroxypropylmethyl cellulose was produced in the same manner as in Example 1. The results are shown in Table 1.

TABLE 1

| | hydroxypropylmethyl Cellulose | | aqueous 2% by weight hydroxypropylmethyl cellulose solution | |
|---|---|---|---|---|
| | methoxy group (DS) | hydroxypropoxy group (MS) | viscosity (mPa · s) | transmittance (%) |
| Example 1 | 1.90 | 0.25 | 410 | 98.0 |
| Example 2 | 1.90 | 0.25 | 400 | 98.0 |
| Example 3 | 1.90 | 0.25 | 415 | 98.0 |
| Example 4 | 1.90 | 0.25 | 390 | 98.0 |
| Comp. Ex. 1 | 1.90 | 0.25 | 350 | 92.0 |

In Examples 1 to 4, because the concentration of cellulose particles was kept at a low level, an increase in the weight ratio of the alkali metal hydroxide to a solid component in the pulp owing to the decline in the efficiently of draining, and the problems in the step of draining caused by such an increase, including decline in the transmittance of the cellulose ether, were not observed.

On the other hand, in Comparative Example 1, the efficiency of draining declined owing to the high concentration of cellulose particle so that the weight ratio of the alkali metal hydroxide to a solid component in the pulp was excessively high. As a result, the transmittance of the cellulose ether declined.

The invention claimed is:

1. A method for producing cellulose ether, comprising at least the steps of:
   bringing a pulp into contact with an alkali metal hydroxide solution to obtain a contact product,
   draining the contact product by a drainer to obtain an alkali cellulose,
   reacting the alkali cellulose with an etherifying agent,
   reusing an alkali metal hydroxide solution recovered in the step of draining continuously for contact with a pulp in the step of bringing, and
   adjusting an amount of cellulose particles in the recovered alkali metal hydroxide solution to 0.5% by weight or less prior to reusing for contact with the pulp, wherein the step of adjusting comprises removing a foam layer from the recovered alkali metal hydroxide solution, and said removing a foam layer is selected from the group consisting of removal by overflow, removal by suction, removal by scraping using a blade-like device, and removal by skimming using a ladle-like device.

2. The method for producing cellulose ether according to claim 1, wherein the foam layer in the recovered alkali metal hydroxide solution is obtained by injecting gas into the recovered alkali metal hydroxide solution or stirring the recovered alkali metal hydroxide solution.

3. The method for producing cellulose ether according to claim 1 wherein a continuous operation in the step of reusing refers to more than 50 hours.

\* \* \* \* \*